United States Patent
Bowdich et al.

(10) Patent No.: US 9,550,412 B2
(45) Date of Patent: *Jan. 24, 2017

(54) POWER GENERATION SYSTEM AND METHOD FOR ASSEMBLING THE SAME

(71) Applicant: MTU America Inc., Novi, MI (US)

(72) Inventors: Mark Daniel Bowdich, Berkley, MI (US); Douglas Edwin Berry, St. George, UT (US); Bruce Ernest Richard Wolff, Livonia, MI (US); Gerhard Kramer, Pluederhausen (DE); Scott Daniel Woodruff, Farmington Hills, MI (US); Ulrich Handel, Friedrichshafen (DE)

(73) Assignee: MTU America Inc., Novi, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/590,698

(22) Filed: Jan. 6, 2015

(65) Prior Publication Data

US 2015/0114732 A1    Apr. 30, 2015

Related U.S. Application Data

(63) Continuation-in-part of application No. 13/930,782, filed on Jun. 28, 2013, now Pat. No. 8,925,660, which
(Continued)

(51) Int. Cl.
*B60K 6/20* (2007.10)
*B60K 6/46* (2007.10)
(Continued)

(52) U.S. Cl.
CPC . *B60K 6/46* (2013.01); *H02K 5/24* (2013.01); *H02K 7/003* (2013.01); *H02K 7/116* (2013.01);
(Continued)

(58) Field of Classification Search
CPC ...... F02B 63/04; Y10S 903/951; H02K 7/116; H02K 7/1815; H02K 5/24; H02K 7/003; B61C 5/00; B60K 6/46
See application file for complete search history.

(56) References Cited

U.S. PATENT DOCUMENTS 2,637,277 A * 5/1953 Altorfer ............... B61C 5/00
                                                    105/36
3,153,920 A * 10/1964 Ireland ................ F16D 3/221
                                                    464/140
(Continued)

FOREIGN PATENT DOCUMENTS

EP    0666192 A1    8/1995
EP    1172525 A1    1/2002

OTHER PUBLICATIONS

Geislinger GmbH, 5300 Hallwang, Austria Gesilco Catalog: Version 6.1; Geislinger Couplings and Dampers, 55 pages.
(Continued)

*Primary Examiner* — Paul N Dickson
*Assistant Examiner* — Timothy Wilhelm
(74) *Attorney, Agent, or Firm* — Duane Morris LLP

(57) ABSTRACT

A power generation system is disclosed. The power generation system includes an electrical converting device and a repowered portion connected to the electrical converting device. The repowered portion includes a reciprocating internal combustion engine and a gearbox. The reciprocating internal combustion engine is connected to the gearbox by a first connecting structure. The gearbox is connected to the electrical converting device by a second connecting structure.

29 Claims, 8 Drawing Sheets

Related U.S. Application Data is a continuation of application No. 13/427,573, filed on Mar. 22, 2012, now Pat. No. 8,490,726, which is a continuation of application No. 12/470,209, filed on May 21, 2009, now Pat. No. 8,167,062.

(51) Int. Cl.
*H02K 7/18* (2006.01)
*H02K 5/24* (2006.01)
*H02K 7/00* (2006.01)
*H02K 7/116* (2006.01)

(52) U.S. Cl.
CPC .......... *H02K 7/1815* (2013.01); *Y10S 903/902* (2013.01); *Y10S 903/905* (2013.01); *Y10S 903/951* (2013.01); *Y10T 29/49002* (2015.01); *Y10T 29/49009* (2015.01)

(56) References Cited

U.S. PATENT DOCUMENTS

| | | | | |
|---|---|---|---|---|
| 3,289,781 A * | 12/1966 | Ferguson | F02F 7/0082 | 180/292 |
| 3,362,352 A * | 1/1968 | Cripe | B61O 5/00 | 105/117 |
| 3,363,446 A * | 1/1968 | Kaley | B61L 25/021 | 73/1.37 |
| 3,673,813 A * | 7/1972 | Wright | F16D 3/72 | 464/180 |
| 3,791,169 A * | 2/1974 | Wright | F16D 3/72 | 464/180 |
| 4,095,665 A * | 6/1978 | Armfield | B60K 1/00 | 180/65.235 |
| 4,204,589 A * | 5/1980 | Loker | F16D 3/58 | 192/27 |
| 4,282,947 A * | 8/1981 | Kemper | B60K 6/105 | 180/165 |
| 4,432,739 A * | 2/1984 | Walter | F16D 3/80 | 464/24 |
| 4,570,077 A * | 2/1986 | Lambley | B63J 3/02 | 290/1 R |
| 4,928,635 A * | 5/1990 | Shelor | F01K 23/065 | 122/1 R |
| 5,492,311 A * | 2/1996 | Kurr | F16F 13/26 | 267/122 |
| 5,582,262 A | 12/1996 | Wust | | |
| 5,845,734 A * | 12/1998 | Samardzich | B60K 5/1216 | 180/299 |
| 5,975,227 A * | 11/1999 | Vlad | B60K 6/46 | 180/65.245 |
| 6,105,697 A * | 8/2000 | Weaver | B60H 1/18 | 180/65.245 |
| 6,455,947 B1 * | 9/2002 | Lilley | B60K 6/38 | 180/65.6 |
| 6,478,100 B1 * | 11/2002 | Grewe | B60K 6/24 | 180/65.245 |
| 6,688,802 B2 * | 2/2004 | Ross | F16D 1/076 | 403/337 |
| 7,108,095 B1 * | 9/2006 | Washington | B60L 11/16 | 180/165 |
| 7,361,069 B2 * | 4/2008 | Mansfield | B63H 20/02 | 440/112 |
| 7,384,371 B2 * | 6/2008 | Liebl | B60K 6/46 | 477/3 |
| 7,462,121 B2 * | 12/2008 | Janson | B60K 6/387 | 475/214 |
| 7,597,164 B2 * | 10/2009 | Severinsky | B60H 1/004 | 180/65.27 |
| 7,770,550 B2 * | 8/2010 | Tanabe | F01L 13/0021 | 123/90.16 |
| 7,841,433 B2 * | 11/2010 | Soliman | B60K 6/442 | 180/65.21 |
| 8,820,247 B1 * | 9/2014 | Claussen | B61O 5/00 | 105/35 |
| 2003/0183467 A1 * | 10/2003 | Kozarekar | B60K 6/22 | 188/380 |
| 2004/0112654 A1 * | 6/2004 | Kozarekar | B60K 6/22 | 180/65.235 |
| 2004/0168657 A1 * | 9/2004 | Gooijer | F02B 75/047 | 123/78 F |
| 2004/0204286 A1 * | 10/2004 | Stridsberg | B60K 6/405 | 477/14 |
| 2007/0049379 A1 * | 3/2007 | Faass | F16D 3/74 | 464/79 |
| 2007/0145745 A1 | 6/2007 | Woods et al. | | |
| 2008/0314661 A1 * | 12/2008 | Soliman | B60K 6/442 | 180/65.245 |
| 2009/0127930 A1 * | 5/2009 | Senda | B60R 16/03 | 307/9.1 |
| 2009/0171523 A1 * | 7/2009 | Luo | B60K 6/387 | 701/22 |
| 2009/0239703 A1 * | 9/2009 | Carlhammar | B60K 6/48 | 477/3 |
| 2010/0240491 A1 * | 9/2010 | Vyas | B60K 6/40 | 477/3 |

OTHER PUBLICATIONS

International Search Report for PCT/US2010/035504 dated Dec. 2, 2010.
Electro-Motive Division, General Motors Corporation "Maintenance Instruction"; AR10-D14 Traction Generator (19 pages).
Cotta Transmission Company, "Locomotive Repower", Application Sheet (6 pages).
Office Action dated Jun. 2, 2011 for U.S. Appl. No. 12/470,209.
Office Action dated Oct. 14, 2011 for U.S. Appl. No. 12/470,209.
Office Action for U.S. Appl. No. 13/427,573 Dated Jun. 7, 2012.
Office Action for U.S. Appl. No. 12/470,209, Dated Jun. 2, 2011.
Office Action for U.S. Appl. No. 12/470,209, Dated Oct. 14, 2011.
Office Action for Canadian counterpart application No. 2,762,167 dated Dec. 19, 2013 (4 pages).
Office Action for U.S. Appl. No. 13/930,782 dated Aug. 20, 2013.
Office Action for U.S. Appl. No. 13/930,782 dated Nov. 7, 2013.
Office Action for U.S. Appl. No. 13/930,782 dated Apr. 22, 2014.

* cited by examiner

POWER GENERATION SYSTEM AND METHOD FOR ASSEMBLING THE SAME

REFERENCE TO RELATED APPLICATIONS

This U.S. patent application is a continuation-in-part of U.S. Ser. No. 13/390,782 filed on Jun. 28, 2013, now U.S. Pat. No. 8,925,660 issued on Jan. 6, 2015, which is a continuation application of U.S. Ser. No. 13/427,573 filed on Mar. 22, 2012, now U.S. Pat. No. 8,490,726 issued on Jul. 23, 2013, which is a continuation application of U.S. Ser. No. 12/470,209 filed on May 21, 2009, now U.S. Pat. No. 8,167,062 issued on May 1, 2012. The disclosure of the prior applications is considered part of the disclosure of this application and are hereby incorporated by reference in their entirety.

TECHNICAL FIELD

The invention relates to a power generation system and to a method for assembling the same.

BACKGROUND

It is known in the art that some types of industrial vehicle applications (e.g., locomotives, marine vessels and the like) may utilize a reciprocating internal combustion engine for propelling the vehicle. Further, it is known in the art that an electrical converting device (e.g., a traction alternator/traction generator) may be connected to and be driven by the reciprocating internal combustion engine.

Although conventional industrial vehicle applications including an arrangement of a reciprocating internal combustion engine and electrical converting device have proven to be useful, there have been efforts to "repower" such conventional industrial vehicle applications. "Repowering" a conventional industrial vehicle application usually includes the removal and subsequent replacement of an originally-installed/older/less efficient/"higher emission" reciprocating internal combustion engine with a new reciprocating internal combustion engine. The intent of providing the new reciprocating internal combustion engine may be, for example, to provide a "cleaner"/more efficient industrial vehicle application when compared to other industrial vehicle applications including an originally-installed/older/less efficient/"high emission" reciprocating internal combustion engine.

However, it has been recognized that "repowering" industrial vehicles may undesirably introduce several structural and/or performance-related concerns such that the usefulness and/or benefits to be realized by a "repowered" industrial vehicle application may be otherwise limited or prevented. Therefore, a need exists in the art for a power generation system and method for assembling the same in relation to "repowered" industrial vehicle applications.

BRIEF DESCRIPTION OF THE DRAWINGS

The disclosure will now be described, by way of example, with reference to the accompanying drawings, in which.

DETAILED DESCRIPTION

The Figures illustrate an exemplary embodiment of a novel power generation system and method for assembling the same in accordance with an embodiment of the invention. Based on the foregoing, it is to be generally understood that the nomenclature used herein is simply for convenience and the terms used to describe the invention should be given the broadest meaning by one of ordinary skill in the art.

Regarding the Power Generation System 120

Figure 1A:
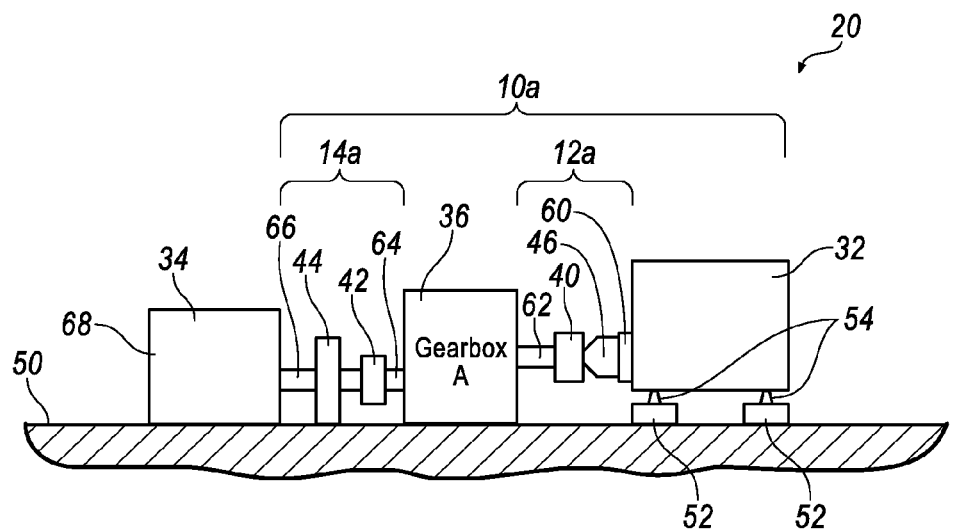
FIG. 1A is a schematic diagram of a power generation system in accordance with an embodiment of the invention.
Figure 1B:
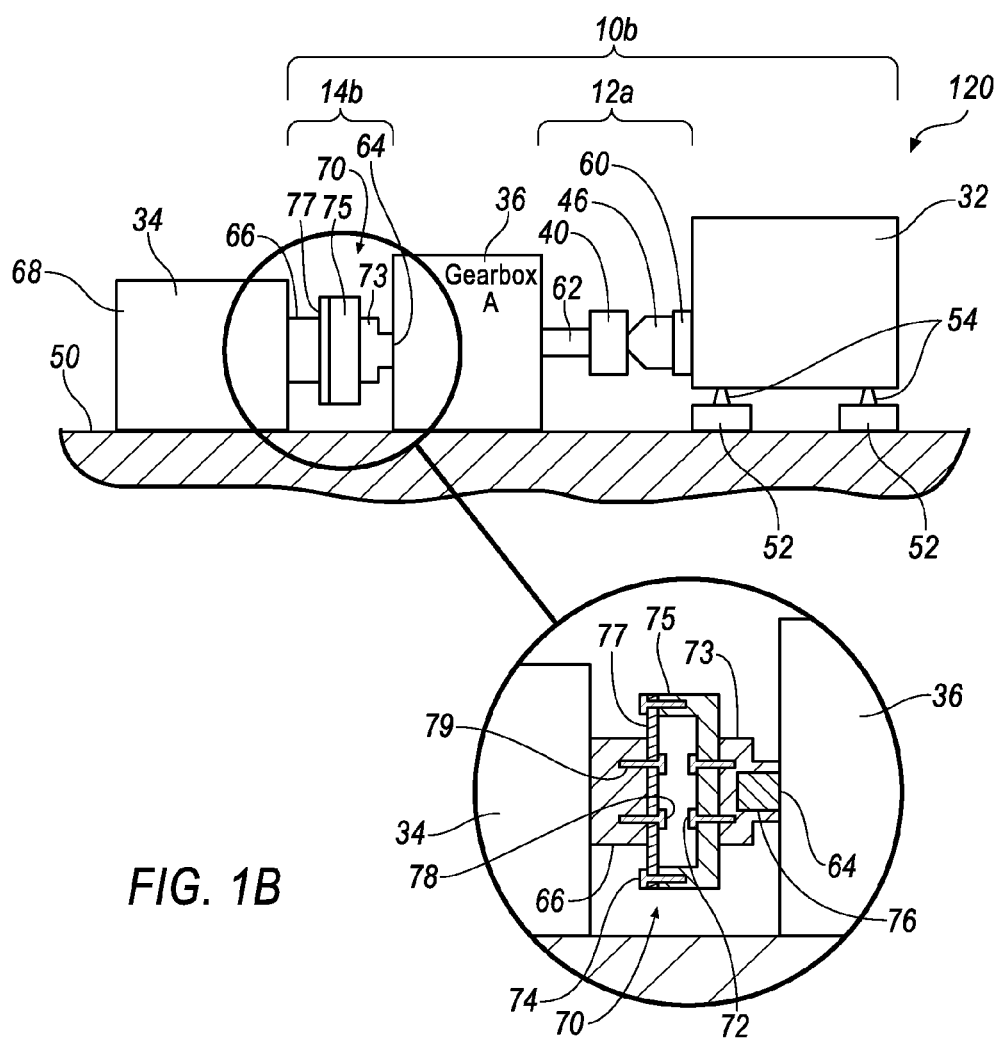
FIG. 1B is a schematic diagram of a power generation system in accordance with an embodiment of the invention.

Referring to FIG. 1B, a power generation system is shown generally at 120 having a repowered portion 10b in accordance with an embodiment of the invention. Comparatively, the repowered portion 10b is substantially similar to the repowered portion 10a shown in FIG. 1A except for the arrangement of the second connecting structure, which is shown generally at 14b.

In an embodiment, the second connecting structure 14b may be characterized as a direct power transmitting connection 70 including a hub member 73 connected to a rigid circular disk 75 by a first plurality of fasteners 72 (e.g., bolts) and a flexible circular disk (e.g., a flexplate) 77 connected to the input 66 (i.e., a driven end of a rotor) by a second plurality of fasteners 78. The flexible circular disk 77 is then connected to the rigid circular disk 75 by a third plurality of fasteners 74 (e.g., bolts). In an embodiment, the hub member 73 may include a recess 76 to permit insertion and subsequent connection of the gearbox output 64 with the hub member 73.

Functionally, the second connecting structure 14b is a mechanical connection that permits the gearbox 36 to transmit power originating from the reciprocating internal combustion engine 32 to the electrical converting device 34. Further, it will be appreciated that the direct power transmitting connection 70 of the second connecting structure 14b may accommodate at least some of the axial misalignment and the relative movement occurring between the input 66 of the electrical converting device 34 and the gearbox output 64. Even further, it will be appreciated that because the support 44 and second misalignment coupling 42 are omitted from the design of the second connecting structure 14b, the gearbox 36 may be characterized to include a stronger gearbox outer housing and larger bearings.

Regarding the Power Generation System 220

Figure 1C:
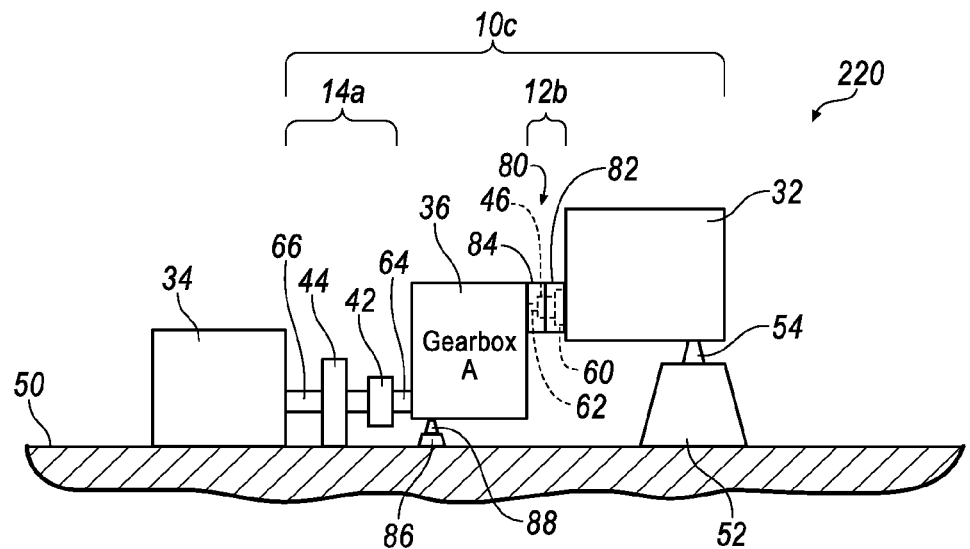
FIG. 1C is a schematic diagram of a power generation system in accordance with an embodiment of the invention.

Referring to FIG. 1C, a power generation system is shown generally at 220 having a repowered portion 10c in accordance with an embodiment of the invention. Comparatively, the repowered portion 10c is substantially similar to the repowered portion 10a shown in FIG. 1A except for the arrangement of the first connecting structure, which is shown generally at 12b. Further, the repowered portion 10c is differentiated from the repowered portion 10a shown in FIG. 1A due to the resilient mounting of the gearbox 36 with respect to the support frame 50 (i.e., the gearbox 36 is rigidly mounted to the support frame 50 in FIG. 1A); as such, it will be appreciated that the first misalignment coupling 40 may be omitted from the design of the first connecting structure 12b because both of the reciprocating internal combustion engine 32 and gearbox 36 are resiliently mounted. Yet even further, in an embodiment, the repowered portion 10c is differentiated from the repowered portion 10a shown in FIG. 1A in that the second misalignment coupling 42 may allow for a larger range of motion arising from the resilient mounting of the gearbox 36 as well as for the bending and twisting of the support frame 50.

In an embodiment, the first connecting structure 12b may be characterized as a flanged connection 80 having a torsionally resilient coupling 46. Further, in an embodiment, this flanged connection 80 possesses the function of rigidly connecting the reciprocating internal combustion engine 32 to the gearbox 36, such that the reciprocating internal combustion engine 32, the flanged connection 80 and the gearbox 36 form a common resilient mounting structure.

In an embodiment, the torsionally resilient coupling 46 is arranged between and connects the output device 60 (e.g., a flywheel) of the reciprocating internal combustion engine 32 and the gearbox input 62 (e.g., a gearbox input shaft) of the gearbox 36. Further, in an embodiment, the first connecting structure 12b may be further characterized to include a flywheel housing 82 connected to the reciprocating internal combustion engine 32 that contains the output device 60, and, the first connecting structure 12b may be further characterized to include a gearbox input housing 84 connected to the gearbox 36 that contains the gearbox input 62. In an embodiment, the housings 82, 84 may be flanged/connected to one another. In an embodiment, the torsionally resilient coupling 46 may be located within one of or both of the flywheel housing 82 and the gearbox input housing 84.

As indicated above, in an embodiment, the gearbox 36 is resiliently mounted with respect to the support frame 50. The resilient mounting of the gearbox 36 is permitted by way of one or more supports 86 connected to the support frame 50 and one or more resilient mounts 88 that connect the gearbox 36 to the one or more supports 86. In an embodiment, the one or more supports 86 may be attached to the support frame 50 by any desirable connection such as, for example, a welded connection. Further, in an embodiment, the one or more supports 86 may include one or more individual members, as illustrated, or, alternatively, one or more parallel elongated members that fulfill the function of both the one or more supports 86 and the one or more supports 52, and that are substantially equal to a geometry (e.g., a length) of the common structure formed by the gearbox 36, the flanged connection 80 and the reciprocating internal combustion engine 32.

Further, in an embodiment, it will be appreciated that the one or more supports 86 and resilient mounts 88 may be utilized concurrently with the one or more supports 52 and resilient mounts 54 to resiliently mount the gearbox 36 and the reciprocating internal combustion engine 32 with respect to the support frame 50. Even further, it will be appreciated that the one or more supports 86 and resilient mounts 88 may be characterized to include dissimilar geometries from the one or more supports 52 and resilient mounts 54 in order to accommodate the alignment of, for example, the output device 60 (e.g., a flywheel) of the reciprocating internal combustion engine 32 and, for example, the gearbox input 62 (e.g., a gearbox input shaft) of the gearbox 36. Yet even further, it will be appreciated that the resilient mounts 54, 88 may be characterized to include different stiffnesses due to different amounts of weight being imparted to the resilient mounts 54, 88 by, respectively, the reciprocating internal combustion engine 32 and the gearbox 36.

Regarding the Power Generation System 320

Figure 1D:
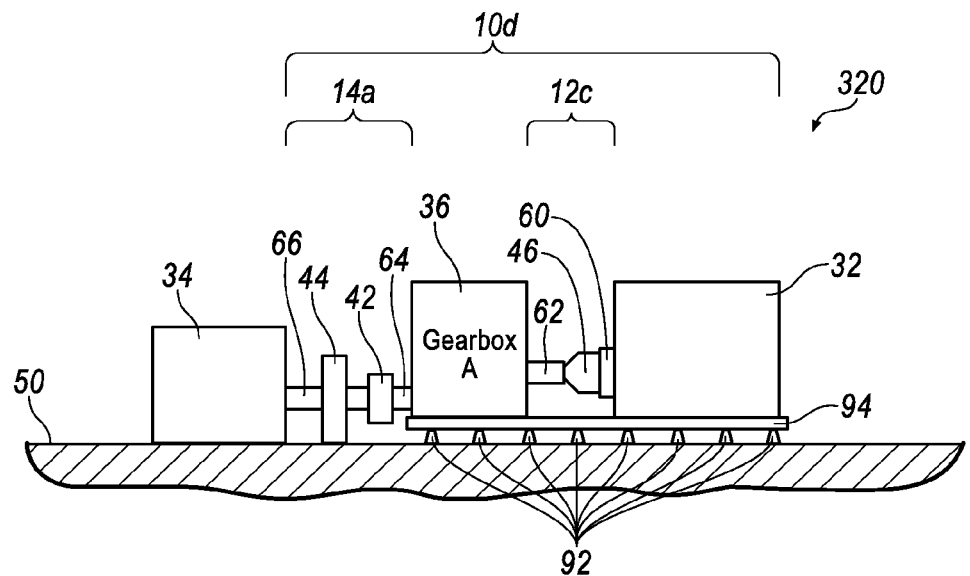
FIG. 1D is a schematic diagram of a power generation system in accordance with an embodiment of the invention.
Figure 2A:
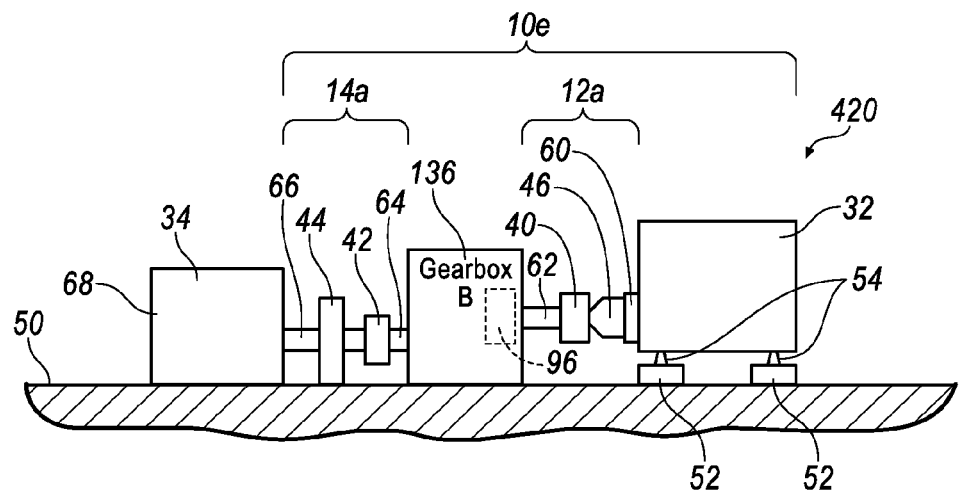
FIG. 2A is a schematic diagram of a power generation system in accordance with an embodiment of the invention.
Figure 2B:
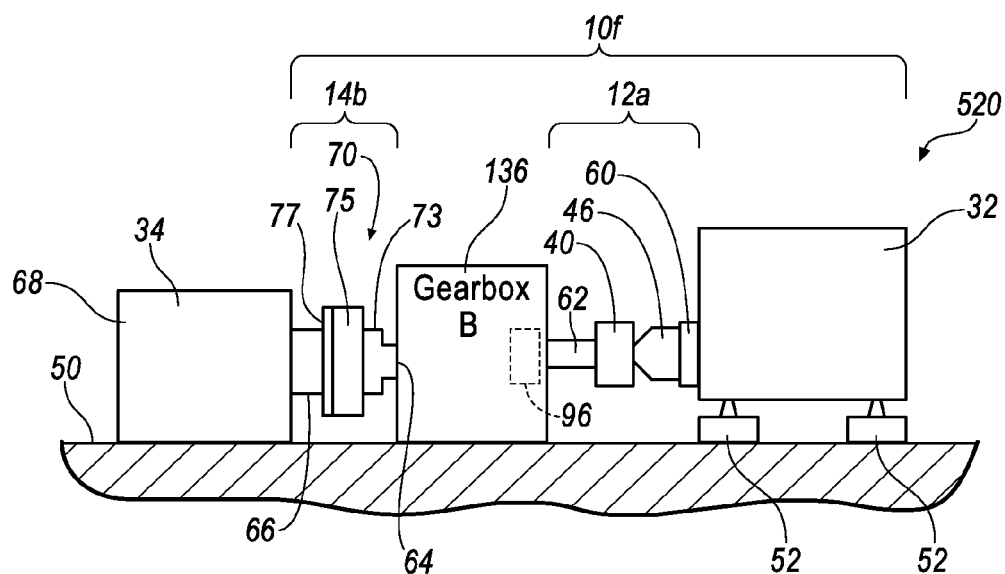
FIG. 2B is a schematic diagram of a power generation system in accordance with an embodiment of the invention.
Figure 2C:
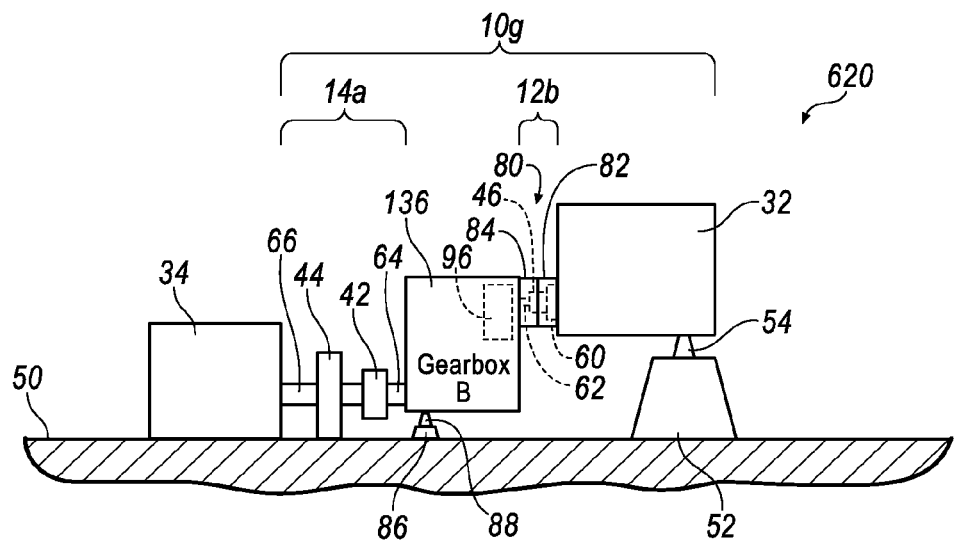
FIG. 2C is a schematic diagram of a power generation system in accordance with an embodiment of the invention.
Figure 2D:
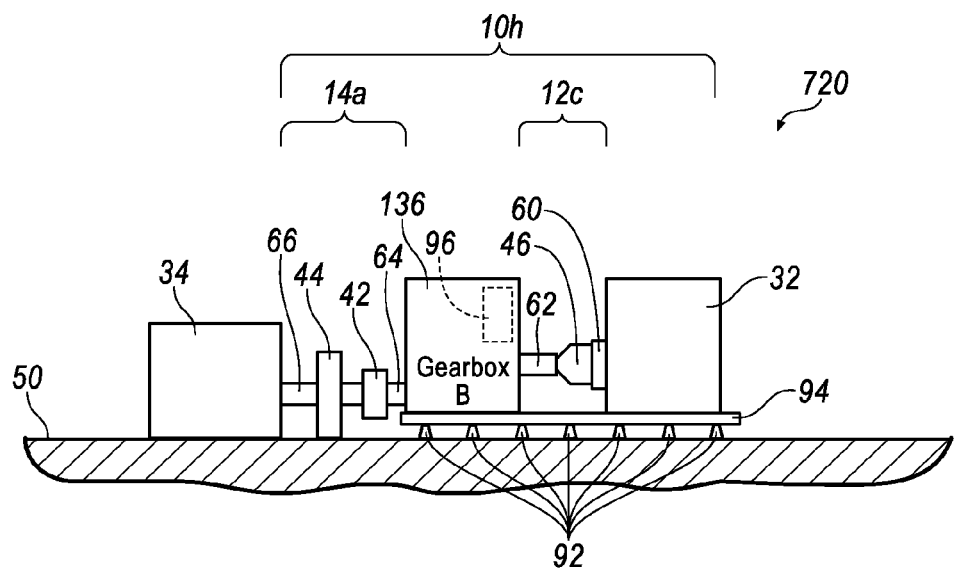
FIG. 2D is a schematic diagram of a power generation system in accordance with an embodiment of the invention.

Referring to FIG. 1D, a power generation system is shown generally at 320 having a repowered portion 10d in accordance with an embodiment of the invention. Comparatively, the repowered portion 10d is substantially similar to the repowered portion 10c shown in FIG. 1C except for a) the arrangement of the resilient mounting of the gearbox 36 and the reciprocating internal combustion engine 32 with respect to the support frame 50, and b) the arrangement of the first connecting structure, which is shown generally at 12c.

Firstly, in an embodiment, the gearbox 36 and reciprocating internal combustion engine 32 of FIG. 1D share and are connected into a common resilient mounting structure by a rigid and strong skid 94 as opposed to their sharing and being connected into a common resilient mounting structure by a flanged connection 80. Secondly, in an embodiment, the first connecting structure 12c is substantially similar to the first connecting structure 12a of FIGS. 1A, 1B except that the first misalignment coupling 40 may be omitted because both of the reciprocating internal combustion engine 32 and gearbox 36 are resiliently mounted.

In an embodiment, the skid 94 is connected to the support frame 50 by a plurality of resilient mounts 92. By arranging both of the gearbox 36 and the reciprocating internal combustion engine 32 on the skid 94, both of the gearbox 36 and the internal combustion engine 32 may be resiliently mounted with a common structure while also maintaining the alignment of, for example, the output device 60 of the reciprocating internal combustion engine 32 and the gearbox input 62 of the gearbox 36.

Regarding the Power Generation Systems 420, 520, 620, 720

Referring to FIGS. 2A-2D, power generation systems are shown respectively at 420, 520, 620, 720 each having a repowered portion 10e, 10f, 10g, 10h in accordance with an embodiment of the invention. In an embodiment, the power generation systems 420, 520, 620, 720 are respectively similar to the power generation systems 20, 120, 220, 320 of FIGS. 1A-1D with the exception of the design of the gearbox (i.e., "Gearbox B"), which is shown generally at 136 in each of FIGS. 2A-2D.

In an embodiment, "Gearbox B" is differentiated from the gearbox 36 (i.e., "Gearbox A") in that "Gearbox B" includes an integrated clutch, overrunning clutch, constant- or variable-fill fluid coupling or torque converter, which is shown generally at 96; it will be appreciated that reference numeral 96 may refer to any of the above-described components and that the invention is not limited to including a clutch, an overrunning clutch, constant- or variable-fill fluid coupling or torque converter at reference numeral 96. In an embodiment, the clutch, integrated overrunning clutch, constant- or variable-fill fluid coupling or torque converter 96 is utilized for selectively translating rotational movement during specific operating conditions (e.g. an idling condition) of the reciprocating internal combustion engine 32 when torque reversals of the output device 60 (e.g., a flywheel) of the reciprocating internal combustion engine 32 are likely to occur. Further, in an embodiment, the torsionally resilient coupling 46 of the repowered portion 10e, 10f, 10g, 10h (as well as the torsionally resilient coupling 46 of the repowered portion 10i, 10j, 10k described in the foregoing description) may be differentiated from the torsionally resilient coupling 46 of the repowered portion 10a, 10b, 10c, 10d in that the torsionally resilient coupling 46 of the repowered portion 10e, 10f, 10g, 10h (or of the repowered portion 10i, 10j, 10k described in the foregoing disclosure) includes a lower degree of torsional stiffness. Because of the arrangement of the internal clutch, overrunning clutch, constant- or variable-fill fluid coupling or torque converter 96 as a component of the "Gearbox B," the gears of "Gearbox B" may not need to be sized to accommodate torque reversals. However, it will be appreciated that "Gearbox B" may include gears with an increased ability to withstand whatever low-magnitude torque pulses may still be transmitted from the output device 60 of the reciprocating internal combustion engine 32 to the gears within the gearbox 136 by way of the torsionally resilient coupling 46 of the repowered portion 10e, 10f, 10g, 10h (or of the repowered portion 10i, 10j, 10k described in the foregoing disclosure) and the clutch, overrunning clutch, constant- or variable-fill fluid coupling or torque converter 96 throughout the range of operating conditions. Further, it will be appreciated that the torsionally resilient coupling 46 of the repowered portion 10e, 10f, 10g, 10h (or of the repowered portion 10i, 10j, 10k described in the foregoing disclosure) may be characterized as having a lower torsional stiffness than the torsionally resilient coupling 46 of the repowered portion 10a, 10b, 10c, 10d due to the clutch, overrunning clutch, constant- or variable-fill fluid coupling or torque converter 96 reducing the need for high torsional stiffness within the torsionally resilient coupling 46 to avoid damage being imparted to the torsionally resilient coupling 46 arising from extremely high-magnitude torque pulses during, for example, the starting of the reciprocating internal combustion engine 32.

Operationally, in an embodiment, '96' may include a clutch such that when the reciprocating internal combustion engine 32 is in an idle condition, the clutch 96 may be disengaged completely, or, alternatively, the applied pressure of the clutch 96 may be reduced. As such, the gearbox 136 may be permitted to continue to operate as the clutch 96 may allow for a controlled amount of slip when the reciprocating internal combustion engine 32 is idling; in an embodiment, the slipping may be controlled by a control system (not shown) that adjusts the reduced pressure applied by the clutch 96. Further, in an embodiment, the same method of allowing a controlled amount of slip within the clutch 96 may be used, in the example of a locomotive, during dynamic braking when the electrical converting device 34 may be required to rotate at a somewhat elevated speed to produce field current for the locomotive's traction motors (not shown), while the net power being transmitted through the power generation system remains low. Functionally, allowing the clutch 96 to slip during idle and dynamic braking may isolate the gears within the gearbox 136 from whatever low-magnitude torque reversals may be produced during idle and dynamic braking. Further, if, for example, '96' is a clutch, it will be appreciated that in some circumstances a small amount of power may still need to be transmitted to the electrical converting device 34 during conditions conducive to torque reversals; as such, by permitting the clutch 96 to slip rather than disengage, the clutch 96 may permit the electrical converting device 34 to receive the small amount of power from the reciprocating internal combustion engine 32. Such examples may include circumstances where the electrical converting device 34 is needed to power small auxiliary loads during idle, or, to provide a field current for exciting traction motors during dynamic braking. As such, by allowing the clutch 96 to slip, additional isolation is provided between the torque pulses of the reciprocating internal combustion engine 32 and the rotating mass of the electrical converting device 34. Further, in an embodiment, it will be appreciated that because "Gearbox B" includes the clutch 96, the gears may not need to be sized accordingly to accommodate torque reversal from the reciprocating internal combustion engine 32. Alternatively, the clutch 96 may be permitted to be disengaged while the reciprocating internal combustion engine 32 is being started and stopped while being engaged at all other times (i.e., no slipping), including during idle and dynamic braking. It will be appreciated that in this alternative, wherein the clutch 96 remains engaged, for example, during idle and dynamic braking, the gears may need to be sized accordingly to accommodate the low-magnitude torque reversals that may be present during idle and dynamic braking. Further, in an embodiment, the external clutch 196 may not be disengaged or limit the transfer of torque when the load exerted by the reciprocating internal combustion engine 32 decreases by an amount that produces low-magnitude torque reversals that the gears in "Gearbox C" may be able to withstand. For example, if the power generation system 820, 920, 1020 is utilized in a locomotive during dynamic braking, it may be desirable to allow the external clutch 196 to remain engaged, or, alternatively, to allow the transfer of torque. In another example, the external clutch 196 may remain engaged during idling of the reciprocating internal combustion engine 32, even if the reciprocating internal combustion engine 32 experiences some degree torque reversal. However, it will be appreciated that during some other operational events where one or more of the torque pulse and torque pulse reversal loads may be significantly increased (e.g., during start-up of the reciprocating internal combustion engine 32), the external clutch 196 may disengage or limit the transfer of torque from the reciprocating internal combustion engine 32.

If, for example, '96' includes an overrunning clutch, '96' would be automatically a) engaged whenever torque being transmitted from the reciprocating internal combustion engine 32 is positive and b) disengaged during brief moments when the torque from the reciprocating internal combustion engine 32 is negative; as such, because an overrunning clutch 96 does not slip, it would transmit the full magnitude of any positive torque pulses to the gears, even the extremely large pulses during engine start.

If, for example, '96' includes a constant- or variable-fill fluid coupling, '96' would always be slipping in order to protect the gears from damage arising from torque reversals; in an embodiment, the constant- or variable-fill fluid coupling 96 may include a lock-up clutch (not shown) for controlling and increasing the efficiency of the constant- or variable-fill fluid coupling 96.

If, for example, '96' includes a torque converter, '96' would allow its output torque to be higher than its input torque during high amounts of slip; in an embodiment, the torque converter 96 may include a stator (not shown), and, in an embodiment, may also include a lock-up clutch (not shown).

In an embodiment, "Gearbox B" may be characterized as a type of gearbox that is typically utilized in marine applications (i.e., gearboxes in marine application may include a clutch 96, or may include a constant- or variable-fill fluid coupling or torque converter 96 with some degree of slip). Functionally, the slipping of a constant- or variable-fill fluid coupling or torque converter 96 that does not include a lock-up clutch reduces the effective maximum rated speed of the reciprocating internal combustion engine 32 communicated to the gears within "Gearbox B." Thus, a lower effective maximum rated speed of the reciprocating internal combustion engine 32 may be communicated to the gears.

Further, in an embodiment, it will be appreciated that it may be advantageous to maintain a clutch 96 in a disengaged state, or, to maintain a constant- or variable-fill fluid coupling in an empty state during the starting/stopping of the reciprocating internal combustion engine 32, which may otherwise result in the most severe torque pulses. Further, it will be appreciated that there is not a need for any rotation of the electrical converting device 34 until after the reciprocating internal combustion engine 32 has achieved a stable idle speed. Yet even further, a reduced load would be placed on starter motors, batteries and the like if the electrical converting device 34 is permitted to remain stationary while the reciprocating internal combustion engine 32 is being started; it will be appreciated, however, that the reduced load is an additional benefit of keeping a clutch 96 disengaged or of keeping a variable-fill fluid coupling 96 empty during engine start and should not be construed as a mandatory configuration of an embodiment of the present invention.

Regarding the Power Generation Systems 820, 920, 1020

Figure 3A:
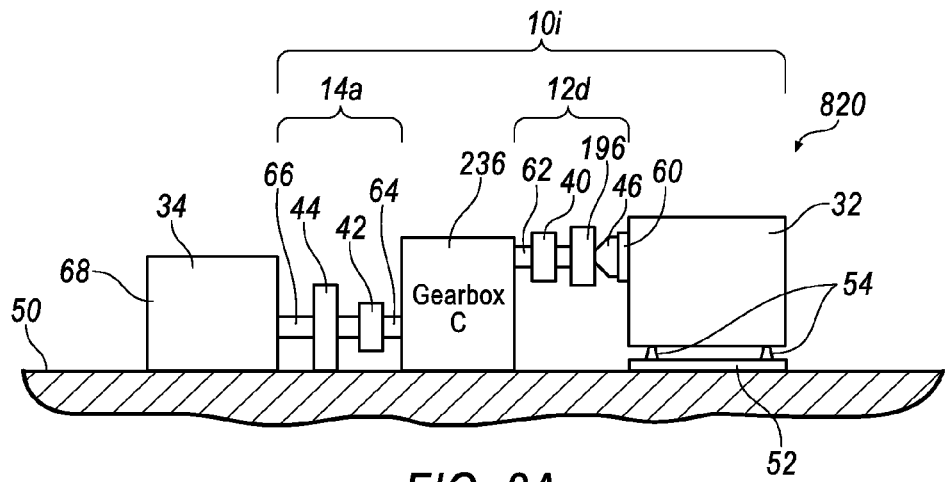
FIG. 3A is a schematic diagram of a power generation system in accordance with an embodiment of the invention.
Figure 3B:
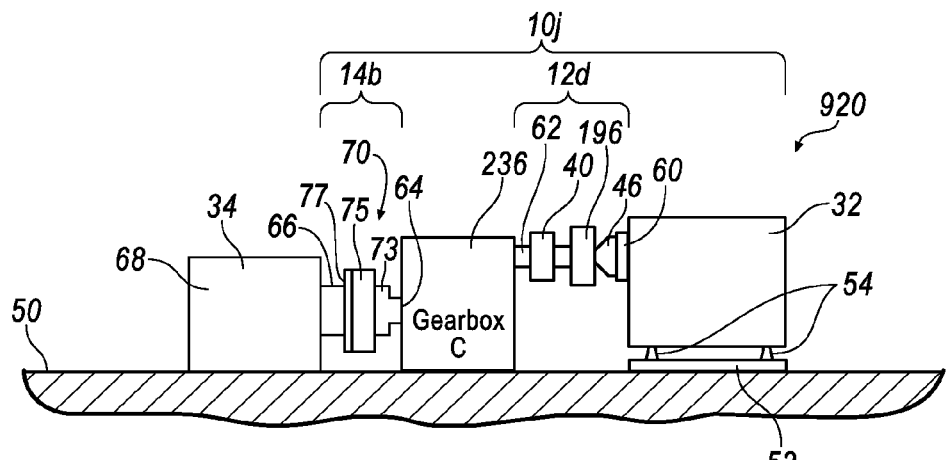
FIG. 3B is a schematic diagram of a power generation system in accordance with an embodiment of the invention.
Figure 3C:
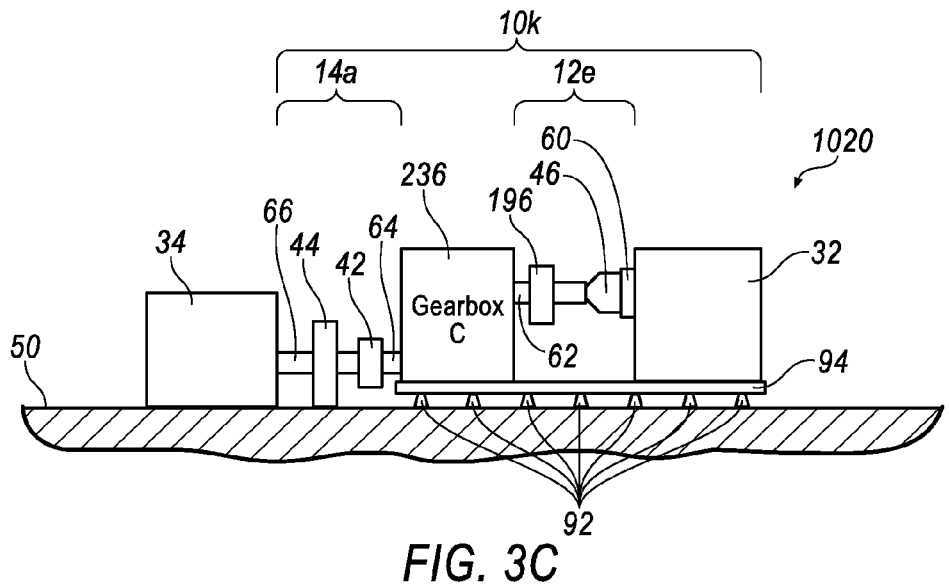
FIG. 3C is a schematic diagram of a power generation system in accordance with an embodiment of the invention.

Referring to FIGS. 3A-3C, power generation systems are shown respectively at 820, 920, 1020 each having a repowered portion 10$i$, 10$j$, 10$k$ in accordance with an embodiment of the invention. In an embodiment, the power generation systems 820, 920, 1020 are respectively similar to the power generation systems 420, 520, 720 of FIGS. 2A, 2B and 2D with the exception of the design of the first connecting structure 12$d$ (see FIGS. 3A-3B), 12$e$ (see FIG. 3C). Further, the power generation systems 820, 920, 1020 are differentiated from the power generation systems 420, 520, 720 by way of the design of the gearbox (i.e., "Gearbox C"), which is shown generally at 236 in FIGS. 3A-3C.

In an embodiment, the first connecting structure 12$d$, 12$e$ is differentiated from first connecting structure 12$a$, 12$c$ by the inclusion of an external clutch, overrunning clutch, constant- or variable-fill fluid coupling or torque converter 196. Further, in an embodiment, the "Gearbox C" is differentiated from the "Gearbox B" by the lack of inclusion of an internal clutch, overrunning clutch, constant- or variable-fill fluid coupling or torque converter 96. In an embodiment, the external clutch, overrunning clutch, constant- or variable-fill fluid coupling or torque converter 196 may be included in the design of the first connecting structure 12$d$, 12$e$ for the purpose of reducing the load on the gearbox input 62 of "Gearbox C."

In an embodiment, the first connecting structure 12$d$ may be characterized by the external clutch, overrunning clutch, constant- or variable-fill fluid coupling or torque converter 196 being arranged between and connecting the torsionally resilient coupling 46 and the first misalignment coupling 40. In an alternative embodiment (not shown), the first connecting structure 12$d$ may be characterized by the external clutch, overrunning clutch, constant- or variable-fill fluid coupling or torque converter 196 being arranged between and connecting the first misalignment coupling 40 and the gearbox input 62. In an embodiment, the first connecting structure 12$e$ may be characterized by the external clutch, overrunning clutch, constant- or variable-fill fluid coupling or torque converter 196 being arranged between and connecting the torsionally resilient coupling 46 and the gearbox input 62 (e.g., a gearbox input shaft) of the gearbox 236.

In an embodiment, the clutch, external overrunning clutch, constant- or variable-fill fluid coupling or torque converter 196 is utilized for selectively translating rotational movement during specific operating conditions (e.g. an idling condition) of the reciprocating internal combustion engine 32 when torque reversals of the output device 60 (e.g., a flywheel) of the reciprocating internal combustion engine 32 are likely to occur. Because of the arrangement of the external clutch, overrunning clutch, constant- or variable-fill fluid coupling or torque converter 196 as a component of the first connecting structure 12$d$, 12$e$, the "Gearbox C" may not need to include an integrated clutch, overrunning clutch, constant- or variable-fill fluid coupling or torque converter 96 as shown and described above with respect to the "Gearbox B," and, also because of this arrangement the gears of "Gearbox C" may not need to be sized to accommodate torque reversals. However, it will be appreciated that "Gearbox C" may include gears with an increased ability to withstand whatever low-magnitude torque pulses may still be transmitted from the output device 60 of the reciprocating internal combustion engine 32 to the gears within the gearbox 236 by way of the torsionally resilient coupling 46 and through the clutch, overrunning clutch, constant- or variable-fill fluid coupling or torque converter 196 throughout the range of operating conditions.

Regarding the Power Generation System 1120

Figure 4:
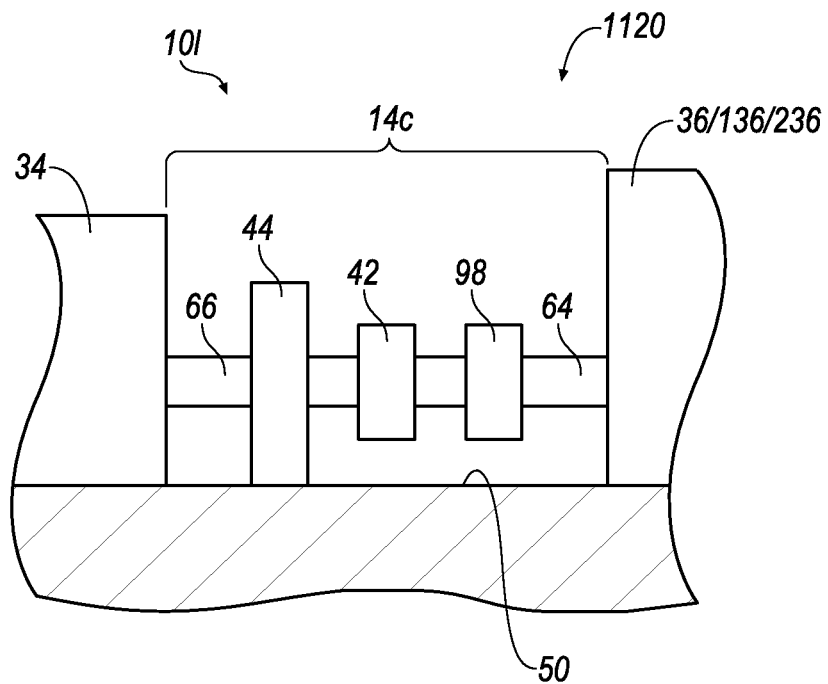
FIG. 4 is a schematic diagram of a portion of a power generation system in accordance with an embodiment of the invention.

Referring to FIG. 4, a portion of a power generation system is shown generally at 1120 in accordance with an embodiment of the invention. The portion of the power generation system 1120 shown in FIG. 4 includes an exemplary second connecting structure 14$c$ that connects an electrical converting device 34 to a gearbox 36/136/236. The second connecting structure 14$c$ will be described in greater detail in the following disclosure whereas the electrical converting device 34 and the gearbox 36/136/236 have been described in the preceding Figures. Further, the second connecting structure 14$c$ may be utilized in place of the second connecting structure 14$a$ of the power generation systems 20, 420, 820 described above at FIGS. 1A, 2A, 3A.

The power generation system 1120 also includes a reciprocating internal combustion engine (not shown but seen at 32 in the preceding Figures). The reciprocating internal combustion engine may be, for example, a diesel engine).

The power generation system 1120 also includes the gearbox 36/136/236 and the electrical converting device 34 (i.e., a device that converts mechanical energy at an input 66 into electrical energy at an output (not shown but seen at 68 in the preceding Figures). The electrical converting device 34 may include, for example, a traction alternator or a traction generator.

The power generation system 1120 also includes a first connecting structure (not shown but seen at 12$a$ or 12$d$ in the preceding Figures) that connects the reciprocating internal combustion engine to the gearbox 36/136/236. The power generation system 1120 also includes the second connecting structure 14c.

The reciprocating internal combustion engine, electrical converting device 34 and gearbox 36/136/236 are mounted to a support frame 50 of an industrial vehicle (e.g., a locomotive, marine vessel or the like). The gearbox 36/136/236 is rigidly mounted to the support frame 50. The electrical converting device 34 is an originally-installed component, and, the reciprocating internal combustion engine is not an originally-installed component, but rather, a replacement component that may be "cleaner" and/or defined by an increased efficiency when compared to an originally-installed reciprocating internal combustion engine (not shown) that has been removed from the support frame 50. In some instances, the electrical converting device 34 may be an identical replacement (e.g., the same model type or number) for an originally-installed electrical converting device, where the originally-installed electrical converting device is damaged or is otherwise no longer able to function reliably. In other instances, the electrical converting device 34 may be mechanically equivalent to the originally-installed electrical converting device, where this mechanical equivalence includes the electrical converting device 34 having an electrical converting device input that is designed to connect directly with the output of the originally-installed reciprocating internal combustion engine, and having a maximum permitted rotating speed that is within, for example, 20% of the maximum permitted rotating speed of the originally-installed reciprocating internal combustion engine.

Because the reciprocating internal combustion engine may not be "immediately compatible" with the electrical converting device 34, the gearbox 36/136/236, the first connecting structure and the second connecting structure 14c may be introduced in order to permit the reciprocating internal combustion engine to functionally cooperate with the electrical converting device 34. Accordingly, a combination of one or more of the reciprocating internal combustion engine, the gearbox 36/136/236, the first connecting structure and the second connecting structure 14c may be referred to as a repowered portion 101 of the power generation system 1120.

Functionally, the second connecting structure 14c is a mechanical connection that permits the gearbox 36/136/236 to transmit power originating from the reciprocating internal combustion engine to the electrical converting device 34. The second connecting structure 14c may include a misalignment coupling 42 and a torsionally resilient coupling 98 for connecting a gearbox output 64 (e.g. a gearbox output shaft) of the gearbox 36/136/236 to an input 66 (i.e., a driven end of a rotor) of the electrical converting device 34.

As seen in FIG. 4, a first end of the torsionally resilient coupling 98 is connected to the gearbox output 64, and, a first end of the misalignment coupling 42 is connected to a second end of the torsionally resilient coupling 98. A second end of the misalignment coupling 42 is connected to the input 66 of the electrical converting device 34.

The torsionally resilient coupling 98 may be functionally utilized as a "rotating shock absorber" that damps torque pulses/vibrations produced by the reciprocating internal combustion engine in order to provide a smoother torque profile to driven equipment (e.g., the electrical converting device 34). In some instances, the torsionally resilient coupling 98 could be utilized instead of, or, in addition to, for example, a torsionally resilient coupling (see, e.g., 46 in FIG. 1A) that is incorporated in the first connecting structure (see, e.g., 12a in FIG. 1A); the choice of whether to include the torsionally resilient coupling 98 in the second connecting structure 14c alone, or, alternatively, in both of the first connecting structure and the second connecting structure 14c would depend on technical characteristics of a particular repowered portion (such as, e.g., the choice of replacement engine being used, the choice of gearbox 36/136/236 being used, and the model of electrical converting device 34 being used, or the like).

The torsionally resilient coupling 98 may be an all-steel coupling that is filled with oil to provide damping. The torsionally resilient coupling 98 may be commercially available from GEISLINGER®. The torsionally resilient coupling 98 is not limited to an all-steel structure, and, as such, the torsionally resilient coupling 98 may include a rubber or silicone material; a rubber or silicone torsionally resilient coupling 98 may be commercially available from VULKAN® and sold under the trade-name VULASTIK®, or, alternatively, a rubber or silicone torsionally resilient coupling 98 may be commercially available from CENTA® and sold under the trade-names CENTAFLEX® or CENTAMAX®.

The misalignment coupling 42 may functionally transmit the rotation of the gearbox output 64 of the gearbox 36/136/236 to the input 66 of the electrical converting device 34. Further, the misalignment coupling 42 may be functionally used to accommodate relative motion occurring between the rigidly mounted gearbox 36/136/236 and the rigidly mounted electrical converting device 34 when the support frame 50 undergoes bending or twisting during vehicle operation.

In an embodiment, the misalignment coupling 42 may include a "Gesilco Butterfly" misalignment coupling commercially available from GEISLINGER®; as a result, the misalignment coupling 42 may be characterized to have a high torque capacity and a high misalignment capacity in a relatively compact length as well as being virtually maintenance-free due to a carbon-fiber construction. The misalignment coupling 42 is not limited to a GESILCO® butterfly-style misalignment coupling, and, as such, any type of coupling that possesses the characteristics discussed above may be used as an alternative to the GESILCO® butterfly-style misalignment coupling.

The second connecting structure 14c may also include a support 44 that supports the driven end or input 66 of the rotor of the electrical converting device 34. The support 44 may functionally align the rotor of the electrical converting device 34 with the stator of the electrical converting device 34. The support 44 is rigidly mounted to the support frame 50.

The support 44 may be included in the design of the second connecting structure 14c if, for example, the electrical converting device 34 is characterized to include a "single bearing" structure that is intended to support only the free end of the rotor of the electrical converting device 34. As such, the support 44 may be included in order to function as a "second bearing" that assists the electrical converting device 34 in the supporting the driven end or input 66 of its rotor. However, if, for example, the electrical converting device 34 is characterized to include a "double bearing" structure, the support 44 may be omitted from the design of the second connecting structure 14c due to the fact that the electrical converting device 34 includes first and second bearings that support the driven end or input 66 of the rotor as well as the free end of the rotor.

Regarding the Power Generation System 1220

Figure 5:
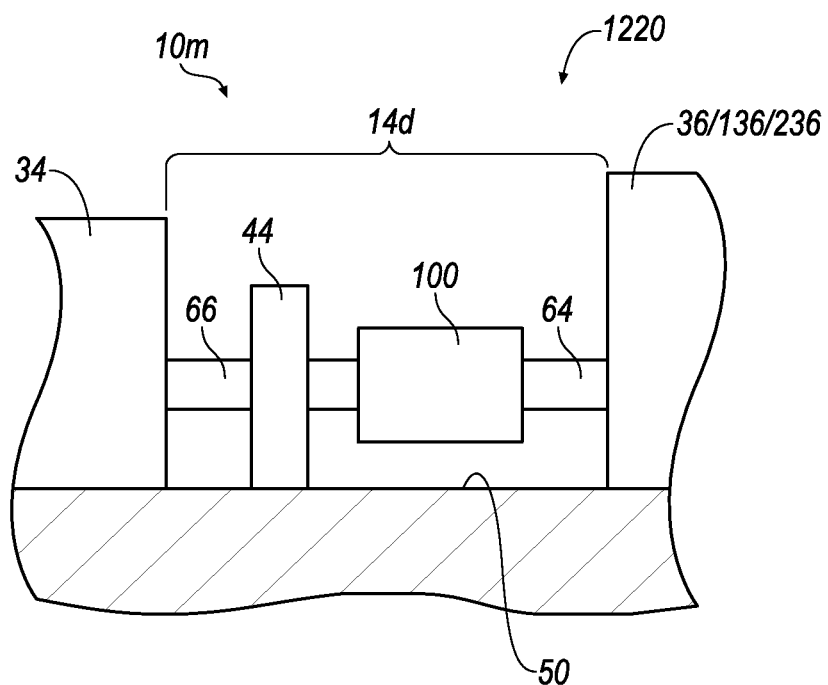
FIG. 5 is a schematic diagram of a portion of a power generation system in accordance with an embodiment of the invention.

Referring to FIG. 5, a portion of a power generation system is shown generally at 1220 in accordance with an embodiment of the invention. The portion of the power generation system 1220 shown in FIG. 5 includes an exemplary second connecting structure 14*d* that connects an electrical converting device 34 to a gearbox 36/136/236. The second connecting structure 14*d* will be described in greater detail in the following disclosure whereas the electrical converting device 34 and the gearbox 36/136/236 have been described in the preceding Figures. Further, the second connecting structure 14*d* may be utilized in place of the second connecting structure 14*a* of the power generation systems 20, 420, 820, 1120 described above at FIGS. 1A, 2A, 3A, 4.

The power generation system 1220 also includes a reciprocating internal combustion engine (not shown but seen at 32 in the preceding Figures). The reciprocating internal combustion engine may be, for example, a diesel engine).

The power generation system 1220 also includes the gearbox 36/136/236 and the electrical converting device 34 (i.e., a device that converts mechanical energy at an input 66 into electrical energy at an output (not shown but seen at 68 in the preceding Figures). The electrical converting device 34 may include, for example, a traction alternator or a traction generator.

The power generation system 1220 also includes a first connecting structure (not shown but seen at 12*a* or 12*d* in the preceding Figures) that connects the reciprocating internal combustion engine to the gearbox 36/136/236. The power generation system 1220 also includes the second connecting structure 14*d*.

The reciprocating internal combustion engine, electrical converting device 34 and gearbox 36/136/236 are mounted to a support frame 50 of an industrial vehicle (e.g., a locomotive, marine vessel or the like). The gearbox 36/136/236 is rigidly mounted to the support frame 50. The electrical converting device 34 is an originally-installed component, and, the reciprocating internal combustion engine is not an originally-installed component, but rather, a replacement component that may be "cleaner" and/or defined by an increased efficiency when compared to an originally-installed reciprocating internal combustion engine (not shown) that has been removed from the support frame 50. In some instances, the electrical converting device 34 may be an identical replacement (e.g., the same model type or number) for an originally-installed electrical converting device, where the originally-installed electrical converting device is damaged or is otherwise no longer able to function reliably. In other instances, the electrical converting device 34 may be mechanically equivalent to the originally-installed electrical converting device, where this mechanical equivalence includes the electrical converting device 34 having an electrical converting device input that is designed to connect directly with the output of the originally-installed reciprocating internal combustion engine, and having a maximum permitted rotating speed that is within, for example, 20% of the maximum permitted rotating speed of the originally-installed reciprocating internal combustion engine.

Because the reciprocating internal combustion engine may not be "immediately compatible" with the electrical converting device 34, the gearbox 36/136/236, the first connecting structure and the second connecting structure 14*d* may be introduced in order to permit the reciprocating internal combustion engine to functionally cooperate with the electrical converting device 34. Accordingly, a combination of one or more of the reciprocating internal combustion engine, the gearbox 36/136/236, the first connecting structure and the second connecting structure 14*d* may be referred to as a repowered portion 10*m* of the power generation system 1220.

Functionally, the second connecting structure 14*d* is a mechanical connection that permits the gearbox 36/136/236 to transmit power originating from the reciprocating internal combustion engine to the electrical converting device 34. The second connecting structure 14*d* may include a torsionally resilient misalignment coupling 100 for connecting a gearbox output 64 (e.g. a gearbox output shaft) of the gearbox 36/136/236 to an input 66 (i.e., a driven end of a rotor) of the electrical converting device 34. The torsionally resilient misalignment coupling 100 is an integrated structural component including both of the misalignment coupling 42 as described above in FIG. 4 and the torsionally resilient coupling 98 as described above in FIG. 4.

As seen in FIG. 5, a first end of the torsionally resilient misalignment coupling 100 is connected to the gearbox output 64. A second end of the torsionally resilient misalignment coupling 100 is connected to the input 66 of the electrical converting device 34.

The torsionally resilient misalignment coupling 100 may be functionally utilized as a "rotating shock absorber" that damps torque pulses/vibrations produced by the reciprocating internal combustion engine in order to provide a smoother torque profile to driven equipment (e.g., the electrical converting device 34).

The torsionally resilient misalignment coupling 100 may also functionally transmit the rotation of the gearbox output 64 of the gearbox 36/136/236 to the input 66 of the electrical converting device 34. Further, the torsionally resilient misalignment coupling 100 may be functionally used to accommodate relative motion occurring between the rigidly mounted gearbox 36/136/236 and the rigidly mounted electrical converting device 34 when the support frame 50 undergoes bending or twisting during vehicle operation.

In an embodiment, the torsionally resilient misalignment coupling 100 may include a "Gesilco Butterfly" misalignment coupling with an integrated oil-filled steel spring coupling commercially available from GEISLINGER®; as a result, the torsionally resilient misalignment coupling 100 may be characterized to have a high torque capacity and a high misalignment capacity in a relatively compact length. The torsionally resilient misalignment coupling 100 is not limited to a GESILCO® butterfly-style misalignment coupling, and, as such, any type of coupling that possesses the characteristics discussed above may be used as an alternative to the GESILCO® butterfly-style misalignment coupling; a rubber or silicone torsionally resilient misalignment coupling 100 may be commercially available from VULKAN® and sold under the trade-name RATO®, or alternatively, a rubber or silicone torsionally resilient misalignment coupling 100 may be commercially available from CENTA® and sold under the trade-name CENTAX®.

The second connecting structure 14*d* may also include a support 44 that supports the driven end or input 66 of the rotor of the electrical converting device 34. The support 44 may functionally align the rotor of the electrical converting device 34 with the stator of the electrical converting device 34. The support 44 is rigidly mounted to the support frame 50.

The support 44 may be included in the design of the second connecting structure 14*d* if, for example, the electrical converting device 34 is characterized to include a "single bearing" structure that is intended to support only the free end of the rotor of the electrical converting device 34. As such, the support 44 may be included in order to function as a "second bearing" that assists the electrical converting device 34 in the supporting the driven end or input 66 of its rotor. However, if, for example, the electrical converting device 34 is characterized to include a "double bearing" structure, the support 44 may be omitted from the design of the second connecting structure 14*d* due to the fact that the electrical converting device 34 includes first and second bearings that support the driven end or input 66 of the rotor as well as the free end of the rotor.

Regarding the Power Generation System 1320

Figure 6:
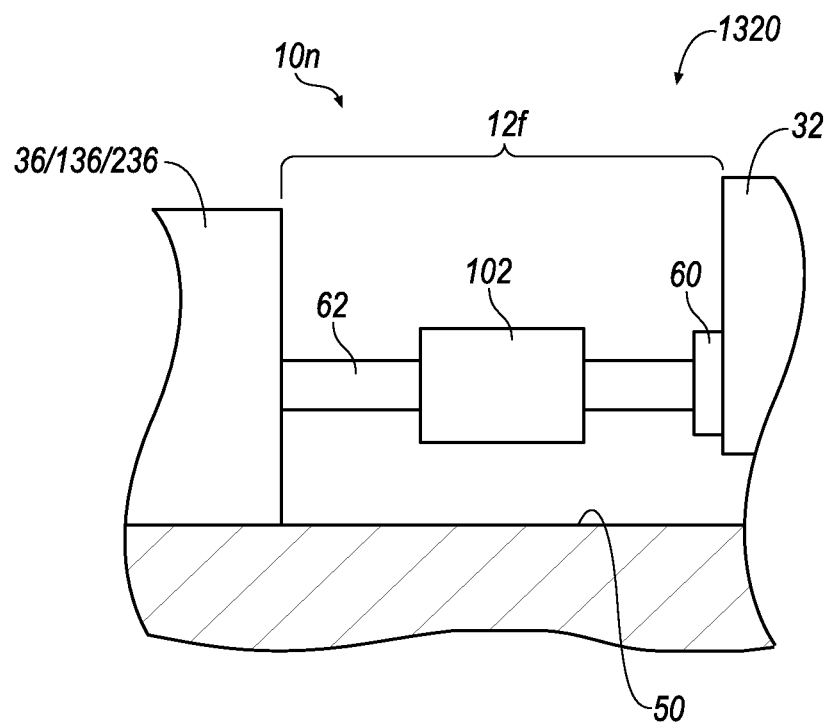
FIG. 6 is a schematic diagram of a portion of a power generation system in accordance with an embodiment of the invention.

Referring to FIG. 6, a portion of a power generation system is shown generally at 1320 in accordance with an embodiment of the invention. The portion of the power generation system 1320 shown in FIG. 6 includes an exemplary first connecting structure 12*f* that connects a reciprocating internal combustion engine 32 (e.g., a diesel engine) to a gearbox 36/136/236. The first connecting structure 12*f* will be described in greater detail in the following disclosure whereas the internal combustion engine 32 and the gearbox 36/136/236 have been described in the preceding Figures. Further, the first connecting structure 12*f* may be utilized in place of the first connecting structure 12*a* or 12*d* of the power generation systems 20, 120, 420, 520, 820, 920 described above at FIGS. 1A, 1B, 2A, 2B, 3A, 3B (noting that for the power generation systems 820 and 920 of FIGS. 3A and 3B that the torsionally resilient misalignment coupling 102 of the first connecting structure 12 may or may not also include the clutch 196).

The power generation system 1320 also includes an electrical converting device (not shown but seen at 34 in the preceding Figures). The electrical converting device converts mechanical energy at an input (not shown but seen at 66 in the preceding Figures) into electrical energy at an output (not shown but seen at 68 in the preceding Figures). The electrical converting device may include, for example, a traction alternator or a traction generator.

The power generation system 1320 also includes a second connecting structure (not shown but seen at 14*a*, 14*b*, 14*c* or 14*d* in the preceding Figures) that connects the gearbox 36/136/236 to the electrical converting device. The power generation system also includes the first connecting structure 12*f*.

The reciprocating internal combustion engine 32, the electrical converting device and the gearbox 36/136/236 are mounted to a support frame 50 of an industrial vehicle (e.g., a locomotive, marine vessel or the like). The gearbox 36/136/236 is rigidly mounted to the support frame 50. The electrical converting device is an originally-installed component, and, the reciprocating internal combustion engine 32 is not an originally-installed component, but rather, a replacement component that may be "cleaner" and/or defined by an increased efficiency when compared to an originally-installed reciprocating internal combustion engine (not shown) that has been removed from the support frame 50. In some instances, the electrical converting device may be an identical replacement (e.g., the same model type or number) for an originally-installed electrical converting device, where the originally-installed electrical converting device is damaged or is otherwise no longer able to function reliably. In other instances, the electrical converting device may be mechanically equivalent to the originally-installed electrical converting device, where this mechanical equivalence includes the electrical converting device having an electrical converting device input that is designed to connect directly with the output of the originally-installed reciprocating internal combustion engine, and having a maximum permitted rotating speed that is within, for example, 20% of the maximum permitted rotating speed of the originally-installed reciprocating internal combustion engine.

Because the reciprocating internal combustion engine 32 may not be "immediately compatible" with the electrical converting device, the gearbox 36/136/236, the first connecting structure 12*f* and the second connecting structure may be introduced in order to permit the reciprocating internal combustion engine 32 to functionally cooperate with the electrical converting device. Accordingly, a combination of one or more of the reciprocating internal combustion engine 32, the gearbox 36/136/236, the first connecting structure 12*f* and the second connecting structure may be referred to as a repowered portion 10*n* of the power generation system 1320.

Functionally, the first connecting structure 12*f* is a mechanical connection that permits the reciprocating internal combustion engine 32 to transmit power to the gearbox 36/136/236. The first connecting structure 12*f* includes a torsionally resilient misalignment coupling 102 having a first end connected to an output device 60 (e.g., a flywheel) of the reciprocating internal combustion engine 32. The torsionally resilient misalignment coupling 102 includes a second end connected to a gearbox input 62 (e.g., a gearbox input shaft) of the gearbox 36/136/236. As such, the first connecting structure 12*f* may be said to include the output device 60, the torsionally resilient misalignment coupling 102 and the gearbox input 62.

The torsionally resilient misalignment coupling 102 is located between the reciprocating internal combustion engine 32 and the gearbox 36/136/236 for connecting the output device 60 of the reciprocating internal combustion engine 32 to the gearbox input 62 of the gearbox 36/136/236. Functionally, the torsionally resilient misalignment coupling 102 transmits the rotational movement of the output device 60 of the reciprocating internal combustion engine 32 to the gearbox input 62 of the gearbox 36/136/236. Further, the torsionally resilient misalignment coupling 102 may be functionally used as a "rotating shock absorber" that damps torque pulses/vibrations produced by the reciprocating internal combustion engine 32 in order to provide a smoother torque profile to the driven equipment (e.g., the gearbox 36/136/236, and, ultimately, the electrical converting device). Further, the torsionally resilient misalignment coupling 102 may also be functionally used to accommodate at least some relative motion that occurs between a resiliently mounted reciprocating internal combustion engine 32 (see, e.g., supports 52 and resilient mounts 54 described above in the preceding Figures) and a rigidly mounted gearbox 36/136/236 when, for example, the support frame 50 undergoes bending or twisting during vehicle operation, or, for example, during 'shock accelerations' if, for example, a locomotive hits a string of railway cars at too high of a speed (e.g., five miles-per-hour).

In an embodiment, the torsionally resilient misalignment coupling 102 may include a "Gesilco Butterfly" misalignment coupling with an integrated oil-filled steel spring coupling commercially available from GEISLINGER®, which has a high torque capacity in a relatively compact length. It will be appreciated, however, that the torsionally resilient misalignment coupling 102 is not limited to a GESILCO® misalignment coupling and that any type of coupling accommodating at least some relative motion may be used as an alternative to the GESILCO® misalignment coupling; a rubber or silicone torsionally resilient misalignment coupling 100 may be commercially available from VULKAN® and sold under the trade-name RATO®, or, alternatively, a rubber or silicone torsionally resilient misalignment coupling 100 may be commercially available from CENTA® and sold under the trade-name CENTAX®.

Regarding the Power Generation System 1420

Figure 7:
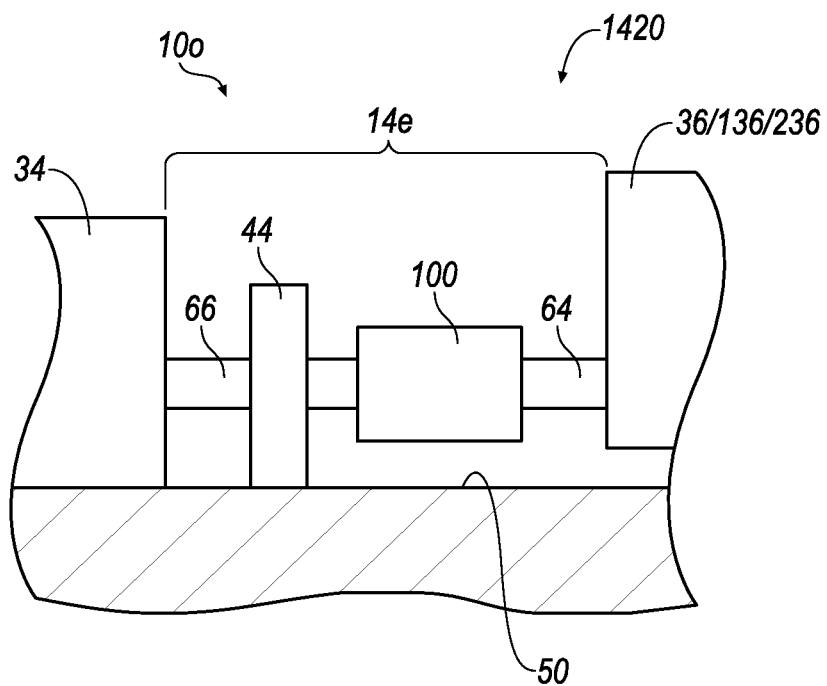
FIG. 7 is a schematic diagram of a portion of a power generation system in accordance with an embodiment of the invention.

Referring to FIG. 7, a portion of a power generation system is shown generally at 1420 in accordance with an embodiment of the invention. The portion of the power generation system 1420 shown in FIG. 7 includes an exemplary second connecting structure 14e that connects an electrical converting device 34 to a gearbox 36/136/236. The second connecting structure 14e will be described in greater detail in the following disclosure whereas the electrical converting device 34 and the gearbox 36/136/236 have been described in the preceding Figures. Further, the second connecting structure 14e may be utilized in place of the second connecting structure 14a of the power generation systems 220, 320, 620, 720, 1020 described above at FIGS. 1C, 1D, 2C, 2D, 3C.

The power generation system 1420 also includes a reciprocating internal combustion engine (not shown but seen at 32 in the preceding Figures). The reciprocating internal combustion engine may be, for example, a diesel engine).

The power generation system 1420 also includes the gearbox 36/136/236 and the electrical converting device 34 (i.e., a device that converts mechanical energy at an input 66 into electrical energy at an output (not shown but seen at 68 in the preceding Figures). The electrical converting device 34 may include, for example, a traction alternator or a traction generator.

The power generation system 1420 also includes a first connecting structure (not shown but seen at 12b, 12c or 12e in the preceding Figures) that connects the reciprocating internal combustion engine to the gearbox 36/136/236. The power generation system 1420 also includes the second connecting structure 14e.

The reciprocating internal combustion engine, electrical converting device 34 and gearbox 36/136/236 are mounted to a support frame 50 of an industrial vehicle (e.g., a locomotive, marine vessel or the like). The gearbox 36/136/236 is resiliently mounted to the support frame 50. The electrical converting device 34 is an originally-installed component, and, the reciprocating internal combustion engine is not an originally-installed component, but rather, a replacement component that may be "cleaner" and/or defined by an increased efficiency when compared to an originally-installed reciprocating internal combustion engine (not shown) that has been removed from the support frame 50. In some instances, the electrical converting device 34 may be an identical replacement (e.g., the same model type or number) for an originally-installed electrical converting device, where the originally-installed electrical converting device is damaged or is otherwise no longer able to function reliably. In other instances, the electrical converting device 34 may be mechanically equivalent to the originally-installed electrical converting device, where this mechanical equivalence includes the electrical converting device 34 having an electrical converting device input that is designed to connect directly with the output of the originally-installed reciprocating internal combustion engine, and having a maximum permitted rotating speed that is within, for example, 20% of the maximum permitted rotating speed of the originally-installed reciprocating internal combustion engine.

Because the reciprocating internal combustion engine may not be "immediately compatible" with the electrical converting device 34, the gearbox 36/136/236, the first connecting structure and the second connecting structure 14e may be introduced in order to permit the reciprocating internal combustion engine to functionally cooperate with the electrical converting device 34. Accordingly, a combination of one or more of the reciprocating internal combustion engine, the gearbox 36/136/236, the first connecting structure and the second connecting structure 14e may be referred to as a repowered portion 10o of the power generation system 1420.

Functionally, the second connecting structure 14e is a mechanical connection that permits the gearbox 36/136/236 to transmit power originating from the reciprocating internal combustion engine to the electrical converting device 34. The second connecting structure 14e may include a torsionally resilient misalignment coupling 100 for connecting a gearbox output 64 (e.g. a gearbox output shaft) of the gearbox 36/136/236 to an input 66 (i.e., a driven end of a rotor) of the electrical converting device 34. The torsionally resilient misalignment coupling 100 is an integrated structural component including both of the misalignment coupling 42 as described above in FIG. 4 and the torsionally resilient coupling 98 as described above in FIG. 4.

As seen in FIG. 7, a first end of the torsionally resilient misalignment coupling 100 is connected to the gearbox output 64. A second end of the torsionally resilient misalignment coupling 100 is connected to the input 66 of the electrical converting device 34.

The torsionally resilient misalignment coupling 100 may be functionally utilized as a "rotating shock absorber" that damps torque pulses/vibrations produced by the reciprocating internal combustion engine in order to provide a smoother torque profile to driven equipment (e.g., the electrical converting device 34).

The torsionally resilient misalignment coupling 100 may also functionally transmit the rotation of the gearbox output 64 of the gearbox 36/136/236 to the input 66 of the electrical converting device 34. Further, the torsionally resilient misalignment coupling 100 may be functionally used to accommodate relative motion occurring between the resiliently mounted gearbox 36/136/236 and the rigidly mounted electrical converting device 34 when, for example, the support frame 50 undergoes bending or twisting during vehicle operation, or, for example, during 'shock accelerations' if, for example, a locomotive hits a string of railway cars at too high of a speed (e.g., five miles-per-hour).

In an embodiment, the torsionally resilient misalignment coupling 100 may include a "Gesilco Butterfly" misalignment coupling with an integrated oil-filled steel spring coupling commercially available from GEISLINGER®; as a result, the torsionally resilient misalignment coupling 100 may be characterized to have a high torque capacity and a high misalignment capacity in a relatively compact length. The torsionally resilient misalignment coupling 100 is not limited to a GESILCO® butterfly-style misalignment coupling, and, as such, any type of coupling that possesses the characteristics discussed above may be used as an alternative to the GESILCO® butterfly-style misalignment coupling; a rubber or silicone torsionally resilient misalignment coupling 100 may be commercially available from VULKAN® and sold under the trade-name RATO®, or, alternatively, a rubber or silicone torsionally resilient misalignment coupling 100 may be commercially available from CENTA® and sold under the trade-name CENTAX®.

The second connecting structure 14e may also include a support 44 that supports the driven end or input 66 of the rotor of the electrical converting device 34. The support 44 may functionally align the rotor of the electrical converting device 34 with the stator of the electrical converting device 34. The support 44 is rigidly mounted to the support frame 50.

The support 44 may be included in the design of the second connecting structure 14e if, for example, the electrical converting device 34 is characterized to include a "single bearing" structure that is intended to support only the free end of the rotor of the electrical converting device 34. As such, the support 44 may be included in order to function as a "second bearing" that assists the electrical converting device 34 in the supporting the driven end or input 66 of its rotor. However, if, for example, the electrical converting device 34 is characterized to include a "double bearing" structure, the support 44 may be omitted from the design of the second connecting structure 14e due to the fact that the electrical converting device 34 includes first and second bearings that support the driven end or input 66 of the rotor as well as the free end of the rotor.

Regarding the Power Generation System 1520

Figure 8:
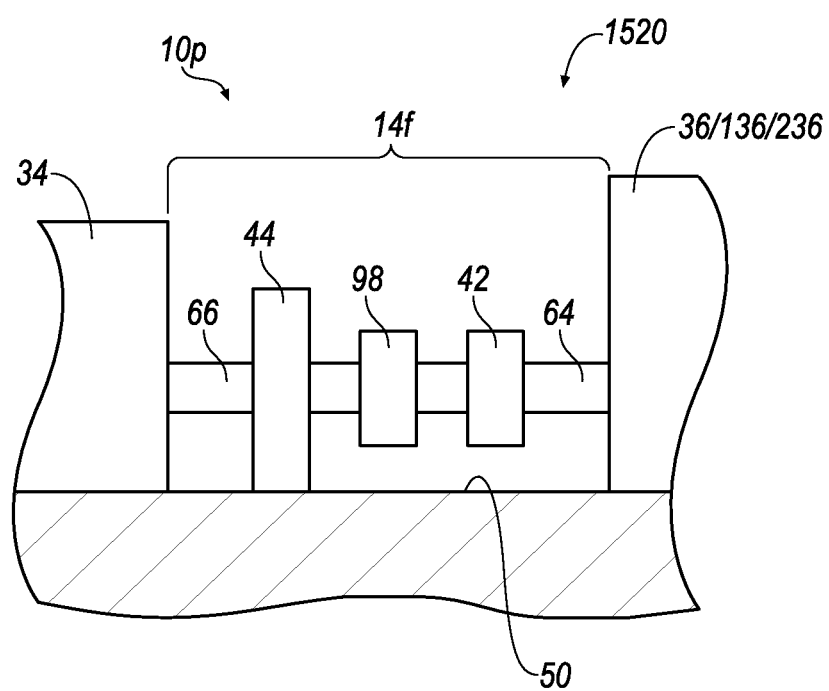
FIG. 8 is a schematic diagram of a portion of a power generation system in accordance with an embodiment of the invention.

Referring to FIG. 8, a portion of a power generation system is shown generally at 1520 in accordance with an embodiment of the invention. The portion of the power generation system 1520 shown in FIG. 8 includes an exemplary second connecting structure 14f that connects an electrical converting device 34 to a gearbox 36/136/236. The second connecting structure 14f will be described in greater detail in the following disclosure whereas the electrical converting device 34 and the gearbox 36/136/236 have been described in the preceding Figures. Further, the second connecting structure 14f may be utilized in place of the second connecting structure 14a of the power generation systems 20, 420, 820, 1120, 1220 described above at FIGS. 1A, 2A, 3A, 4, 5.

The power generation system 1520 also includes a reciprocating internal combustion engine (not shown but seen at 32 in the preceding Figures). The reciprocating internal combustion engine may be, for example, a diesel engine.

The power generation system 1520 also includes the gearbox 36/136/236 and the electrical converting device 34 (i.e., a device that converts mechanical energy at an input 66 into electrical energy at an output (not shown but seen at 68 in the preceding Figures). The electrical converting device 34 may include, for example, a traction alternator or a traction generator.

The power generation system 1520 also includes a first connecting structure (not shown but seen at 12a or 12d in the preceding Figures) that connects the reciprocating internal combustion engine to the gearbox 36/136/236. The power generation system 1520 also includes the second connecting structure 14f.

The reciprocating internal combustion engine, electrical converting device 34 and gearbox 36/136/236 are mounted to a support frame 50 of an industrial vehicle (e.g., a locomotive, marine vessel or the like). The gearbox 36/136/236 is rigidly mounted to the support frame 50. The electrical converting device 34 is an originally-installed component, and, the reciprocating internal combustion engine is not an originally-installed component, but rather, a replacement component that may be "cleaner" and/or defined by an increased efficiency when compared to an originally-installed reciprocating internal combustion engine (not shown) that has been removed from the support frame 50. In some instances, the electrical converting device 34 may be an identical replacement (e.g., the same model type or number) for an originally-installed electrical converting device, where the originally-installed electrical converting device is damaged or is otherwise no longer able to function reliably. In other instances, the electrical converting device 34 may be mechanically equivalent to the originally-installed electrical converting device, where this mechanical equivalence includes the electrical converting device 34 having an electrical converting device input that is designed to connect directly with the output of the originally-installed reciprocating internal combustion engine, and having a maximum permitted rotating speed that is within, for example, 20% of the maximum permitted rotating speed of the originally-installed reciprocating internal combustion engine.

Because the reciprocating internal combustion engine may not be "immediately compatible" with the electrical converting device 34, the gearbox 36/136/236, the first connecting structure and the second connecting structure 14f may be introduced in order to permit the reciprocating internal combustion engine to functionally cooperate with the electrical converting device 34. Accordingly, a combination of one or more of the reciprocating internal combustion engine, the gearbox 36/136/236, the first connecting structure and the second connecting structure 14f may be referred to as a repowered portion 10p of the power generation system 1520.

Functionally, the second connecting structure 14f is a mechanical connection that permits the gearbox 36/136/236 to transmit power originating from the reciprocating internal combustion engine to the electrical converting device 34. The second connecting structure 14f may include a misalignment coupling 42 and a torsionally resilient coupling 98 for connecting a gearbox output 64 (e.g. a gearbox output shaft) of the gearbox 36/136/236 to an input 66 (i.e., a driven end of a rotor) of the electrical converting device 34.

As seen in FIG. 8, a first end of the misalignment coupling 42 is connected to the gearbox output 64, and, a first end of the torsionally resilient coupling 98 is connected to a second end of the misalignment coupling 42. A second end of the torsionally resilient coupling 98 is connected to the input 66 of the electrical converting device 34.

The torsionally resilient coupling 98 may be functionally utilized as a "rotating shock absorber" that damps torque pulses/vibrations produced by the reciprocating internal combustion engine in order to provide a smoother torque profile to driven equipment (e.g., the electrical converting device 34). In some instances, the torsionally resilient coupling 98 could be utilized instead of, or, in addition to, for example, a torsionally resilient coupling (see, e.g., 46 in FIG. 1A) that is incorporated in the first connecting structure (see, e.g., 12a in FIG. 1A); the choice of whether to include the torsionally resilient coupling 98 in the second connecting structure 14f alone, or, alternatively, in both of the first connecting structure and the second connecting structure 14f would depend on technical characteristics of a particular repowered portion (such as, e.g., the choice of replacement engine being used, the choice of gearbox 36/136/236 being used, and the model of electrical converting device 34 being used, or the like).

The torsionally resilient coupling 98 may be an all-steel coupling that is filled with oil to provide damping. The torsionally resilient coupling 98 may be commercially available from GEISLINGER®. The torsionally resilient coupling 98 is not limited to an all-steel structure, and, as such, the torsionally resilient coupling 98 may include a rubber or silicone material; a rubber or silicone torsionally resilient coupling 98 may be commercially available from VULKAN® and sold under the trade-name VULASTIK®, or, alternatively, a rubber or silicone torsionally resilient coupling 98 may be commercially available from CENTA® and sold under the trade-names CENTAFLEX® or CENTA-MAX®.

The misalignment coupling 42 may functionally transmit the rotation of the gearbox output 64 of the gearbox 36/136/236 to the input 66 of the electrical converting device 34. Further, the misalignment coupling 42 may be functionally used to accommodate relative motion occurring between the rigidly mounted gearbox 36/136/236 and the rigidly mounted electrical converting device 34 when the support frame 50 undergoes bending or twisting during vehicle operation.

In an embodiment, the misalignment coupling 42 may include a "Gesilco Butterfly" misalignment coupling commercially available from GEISLINGER®; as a result, the misalignment coupling 42 may be characterized to have a high torque capacity and a high misalignment capacity in a relatively compact length as well as being virtually maintenance-free due to a carbon-fiber construction. The misalignment coupling 42 is not limited to a GESILCO® butterfly-style misalignment coupling, and, as such, any type of coupling that possesses the characteristics discussed above may be used as an alternative to the GESILCO® butterfly-style misalignment coupling.

The second connecting structure 14f may also include a support 44 that supports the driven end or input 66 of the rotor of the electrical converting device 34. The support 44 may functionally align the rotor of the electrical converting device 34 with the stator of the electrical converting device 34. The support 44 is rigidly mounted to the support frame 50.

The support 44 may be included in the design of the second connecting structure 14f if, for example, the electrical converting device 34 is characterized to include a "single bearing" structure that is intended to support only the free end of the rotor of the electrical converting device 34. As such, the support 44 may be included in order to function as a "second bearing" that assists the electrical converting device 34 in the supporting the driven end or input 66 of its rotor. However, if, for example, the electrical converting device 34 is characterized to include a "double bearing" structure, the support 44 may be omitted from the design of the second connecting structure 14f due to the fact that the electrical converting device 34 includes first and second bearings that support the driven end or input 66 of the rotor as well as the free end of the rotor.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:
1. A power generation system, comprising:
an electrical converting device; and
a repowered portion connected to the electrical converting device, wherein the repowered portion includes
a reciprocating internal combustion engine, and
a gearbox, wherein the reciprocating internal combustion engine is connected to the gearbox by
a first connecting structure, wherein the gearbox is connected to the electrical converting device by
a second connecting structure including:
a gearbox output connected to a torsionally resilient coupling,
a misalignment coupling connected to the torsionally resilient coupling, and
an electrical converting device input connected to the misalignment coupling.
2. The power generation system according to claim 1, wherein the electrical converting device, the reciprocating internal combustion engine and the gearbox are connected to a support frame of an industrial vehicle.
3. The power generation system according to claim 2, further comprising:
a resilient mounting portion that connects the reciprocating internal combustion engine to the support frame of the industrial vehicle.
4. The power generation system according to claim 3, wherein the resilient mounting portion provides:
means for resiliently mounting the reciprocating internal combustion engine to the support frame of the industrial vehicle.
5. The power generation system according to claim 3, wherein the resilient mounting portion provides:
means for elevating the reciprocating internal combustion engine away from the support frame of the industrial vehicle for
aligning the reciprocating internal combustion engine with the gearbox with respect to an alignment of the gearbox with the electrical converting device.
6. The power generation system according to claim 2, wherein the gearbox is rigidly-mounted to the support frame of the industrial vehicle.
7. A power generation system, comprising:
an electrical converting device; and
a repowered portion connected to the electrical converting device, wherein the repowered portion includes
a reciprocating internal combustion engine, and
a gearbox, wherein the reciprocating internal combustion engine is connected to the gearbox by
a first connecting structure, wherein the gearbox is connected to the electrical converting device by
a second connecting structure including:
a gearbox output connected to a torsionally resilient misalignment coupling, and
an electrical converting device input connected to the torsionally resilient misalignment coupling.
8. The power generation system according to claim 7, wherein the electrical converting device, the reciprocating internal combustion engine and the gearbox are connected to a support frame of an industrial vehicle.
9. The power generation system according to claim 8, further comprising:
a resilient mounting portion that connects the reciprocating internal combustion engine to the support frame of the industrial vehicle.
10. The power generation system according to claim 9, wherein the resilient mounting portion provides:
means for resiliently mounting the reciprocating internal combustion engine to the support frame of the industrial vehicle.
11. The power generation system according to claim 9, wherein the resilient mounting portion provides:
means for elevating the reciprocating internal combustion engine away from the support frame of the industrial vehicle for
aligning the reciprocating internal combustion engine with the gearbox with respect to an alignment of the gearbox with the electrical converting device.

12. The power generation system according to claim 8, wherein the gearbox is rigidly-mounted to the support frame of the industrial vehicle.

13. A power generation system, comprising:
an electrical converting device; and
a repowered portion connected to the electrical converting device, wherein the repowered portion includes
a reciprocating internal combustion engine, and
a gearbox, wherein the reciprocating internal combustion engine is connected to the gearbox by
a first connecting structure, wherein the gearbox is connected to the electrical converting device by
a second connecting structure, wherein the first connecting structure includes:
an output device of the reciprocating internal combustion engine connected to a torsionally resilient misalignment coupling, and
a gearbox input connected to the torsionally resilient misalignment coupling.

14. The power generation system according to claim 13, wherein the electrical converting device, the reciprocating internal combustion engine and the gearbox are connected to a support frame of an industrial vehicle.

15. The power generation system according to claim 14, further comprising:
a resilient mounting portion that connects the reciprocating internal combustion engine to the support frame of the industrial vehicle.

16. The power generation system according to claim 15, wherein the resilient mounting portion provides:
means for resiliently mounting the reciprocating internal combustion engine to the support frame of the industrial vehicle.

17. The power generation system according to claim 15, wherein the resilient mounting portion provides:
means for elevating the reciprocating internal combustion engine away from the support frame of the industrial vehicle for
aligning the reciprocating internal combustion engine with the gearbox with respect to an alignment of the gearbox with the electrical converting device.

18. The power generation system according to claim 14, wherein the gearbox is rigidly-mounted to the support frame of the industrial vehicle.

19. A power generation system, comprising:
an electrical converting device; and
a repowered portion connected to the electrical converting device, wherein the repowered portion includes
a reciprocating internal combustion engine, and
a gearbox resiliently-mounted to a support frame of an industrial vehicle, wherein the reciprocating internal combustion engine is connected to the gearbox by
a first connecting structure, wherein the gearbox is connected to the electrical converting device by
a second connecting structure including:
a gearbox output connected to a torsionally resilient misalignment coupling, and
an electrical converting device input connected to the torsionally resilient misalignment coupling.

20. The power generation system according to claim 19, wherein the electrical converting device and the reciprocating internal combustion engine are connected to the support frame of the industrial vehicle.

21. The power generation system according to claim 20, further comprising:
a resilient mounting portion that connects one or more of the reciprocating internal combustion engine and the gearbox to the support frame of the industrial vehicle.

22. The power generation system according to claim 21, wherein the resilient mounting portion provides:
means for resiliently mounting one or more of the reciprocating internal combustion engine and the gearbox to the support frame of the industrial vehicle.

23. The power generation system according to claim 21, wherein the resilient mounting portion provides:
means for elevating one or more of the reciprocating internal combustion engine and gearbox away from the support frame of the industrial vehicle for
aligning the reciprocating internal combustion engine with the gearbox with respect to an alignment of the gearbox with the electrical converting device.

24. A power generation system, comprising:
an electrical converting device; and
a repowered portion connected to the electrical converting device, wherein the repowered portion includes
a reciprocating internal combustion engine, and
a gearbox, wherein the reciprocating internal combustion engine is connected to the gearbox by
a first connecting structure, wherein the gearbox is connected to the electrical converting device by
a second connecting structure including:
a gearbox output connected to a misalignment coupling,
a torsionally resilient coupling connected to the misalignment coupling, and
an electrical converting device input connected to the torsionally resilient coupling.

25. The power generation system according to claim 24, wherein the electrical converting device, the reciprocating internal combustion engine and the gearbox are connected to a support frame of an industrial vehicle.

26. The power generation system according to claim 25, further comprising:
a resilient mounting portion that connects the reciprocating internal combustion engine to the support frame of the industrial vehicle.

27. The power generation system according to claim 26, wherein the resilient mounting portion provides:
means for resiliently mounting the reciprocating internal combustion engine to the support frame of the industrial vehicle.

28. The power generation system according to claim 26, wherein the resilient mounting portion provides:
means for elevating the reciprocating internal combustion engine away from the support frame of the industrial vehicle for
aligning the reciprocating internal combustion engine with the gearbox with respect to an alignment of the gearbox with the electrical converting device.

29. The power generation system according to claim 25, wherein the gearbox is rigidly-mounted to the support frame of the industrial vehicle.

* * * * *